United States Patent
Colombo (12)

(10) Patent No.: US 9,083,413 B2
(45) Date of Patent: Jul. 14, 2015

(54) METHOD FOR REDUCING INTERFERENCE IN A RADIO NETWORK EQUIPMENT AND EQUIPMENT PERFORMING THE METHOD

(75) Inventor: Claudio Colombo, Biassono (IT)

(73) Assignee: Alcatel Lucent, Boulogne-Billancourt (FR)

( * ) Notice: Subject to any disclaimer, the term of this patent is extended or adjusted under 35 U.S.C. 154(b) by 1093 days.

(21) Appl. No.: 12/428,536

(22) Filed: Apr. 23, 2009

(65) Prior Publication Data

US 2009/0268792 A1     Oct. 29, 2009

(30) Foreign Application Priority Data

Apr. 24, 2008 (EP) .................................. 08300192

(51) Int. Cl.
  *H04B 7/08*  (2006.01)
  *H04B 1/525*  (2015.01)
  *H04B 7/10*  (2006.01)

(52) U.S. Cl.
  CPC .............. *H04B 7/0808* (2013.01); *H04B 1/525* (2013.01); *H04B 7/10* (2013.01)

(58) Field of Classification Search
  CPC ...... H04B 1/126; H04B 1/1027; H04B 1/525; H04B 3/32; H04B 7/0814; H04B 7/10; H04B 7/15585; H04B 17/0085
  USPC .......................................... 375/284, 285, 346
  See application file for complete search history.

(56) References Cited

U.S. PATENT DOCUMENTS

| 4,701,935 A | * | 10/1987 | Namiki | ........................ 375/214 |
| 5,406,589 A | * | 4/1995 | Iwamatsu et al. | ............. 375/349 |
| 5,794,145 A | | 8/1998 | Milam | |
| 5,933,421 A | * | 8/1999 | Alamouti et al. | ............. 370/330 |
| 6,421,543 B1 | * | 7/2002 | Molnar | ...................... 455/562.1 |
| 6,604,119 B1 | * | 8/2003 | Duttweiler | ...................... 708/313 |
| 2003/0162522 A1 | * | 8/2003 | Valtolina et al. | ............. 455/314 |
| 2005/0226353 A1 | * | 10/2005 | Gebara et al. | ................. 375/346 |
| 2007/0127608 A1 | * | 6/2007 | Scheim et al. | ................ 375/346 |
| 2007/0129076 A1 | * | 6/2007 | Cho et al. | ...................... 455/436 |
| 2008/0165754 A1 | * | 7/2008 | Hu | ................................. 370/342 |

OTHER PUBLICATIONS

"Cross-Polarization Interference Canceller," International Standard, Vo. CEI/IEC, No. 835-2-11, XP008098068, Oct. 1996.
Biester et al. "Hardware Realization of an Xpic System/ Measurement Method and Results," Radio Relay Systems, Conference Publication No. 386, IEE, XP006513624, pp. 255-260, Oct. 11-14, 1993.
European Search Report.

* cited by examiner

*Primary Examiner* — Shuwang Liu
*Assistant Examiner* — David S Huang
(74) *Attorney, Agent, or Firm* — Fay Sharpe LLP

(57) ABSTRACT

Method and system for reducing interference between adjacent antennas wherein one antenna transmits a first signal from a transmitter equipment and a second antenna receives a second signal by a receiver equipment, the first and the second signals may have the same frequency, and the angular discrimination between the TX antenna and the RX antenna in the same location is low. The transmitter equipment inputs an intermediate frequency contribution of the first signal into a cross-polar interference canceller, included in the receiver equipment, for reducing a co-channel interference in the receiver equipment caused by the first and the second signals, wherein the cross-polar interference canceller selects a desired signal from the two signals received so as to reduce said interference.

9 Claims, 4 Drawing Sheets

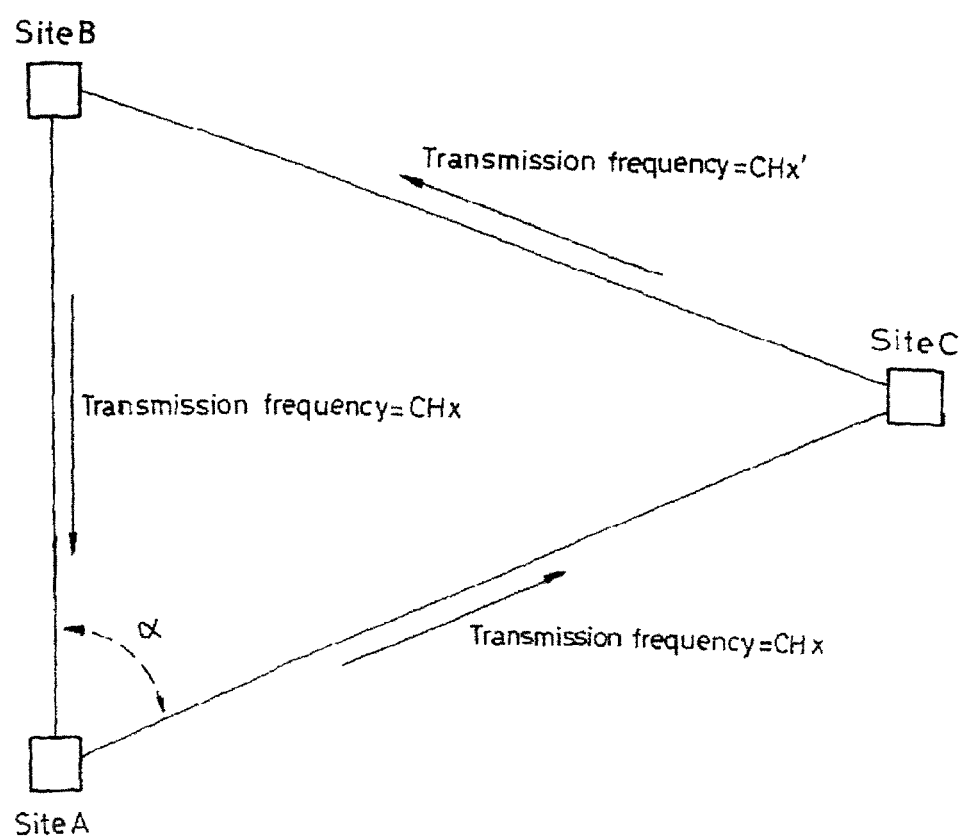

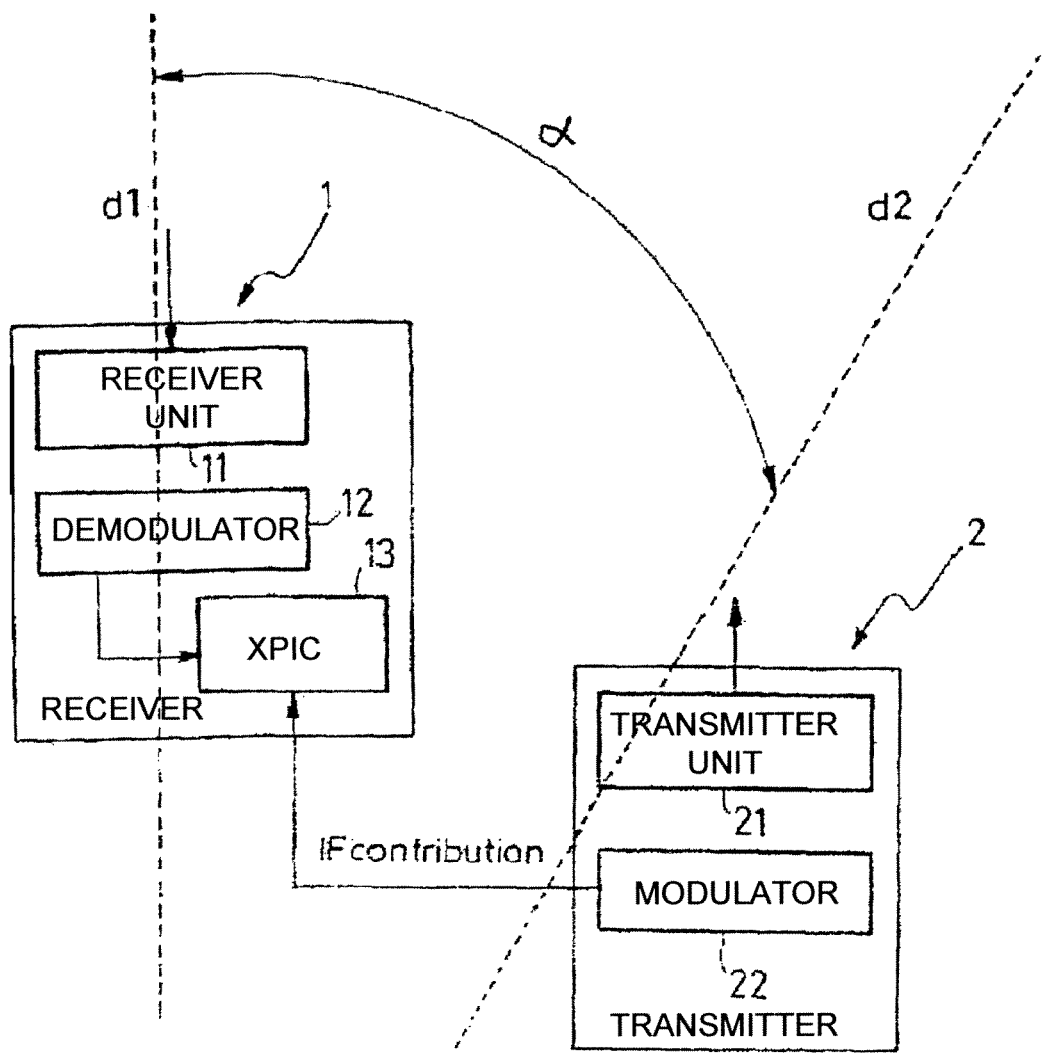
FIG_2

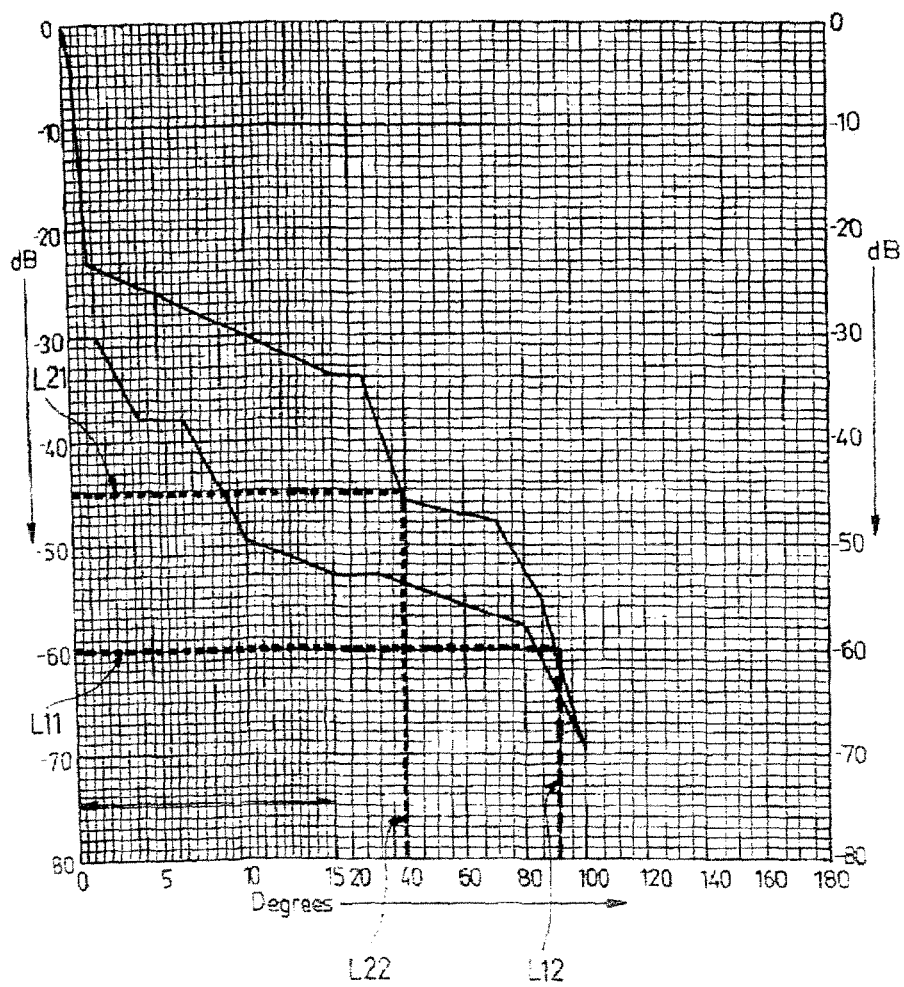
FIG_3

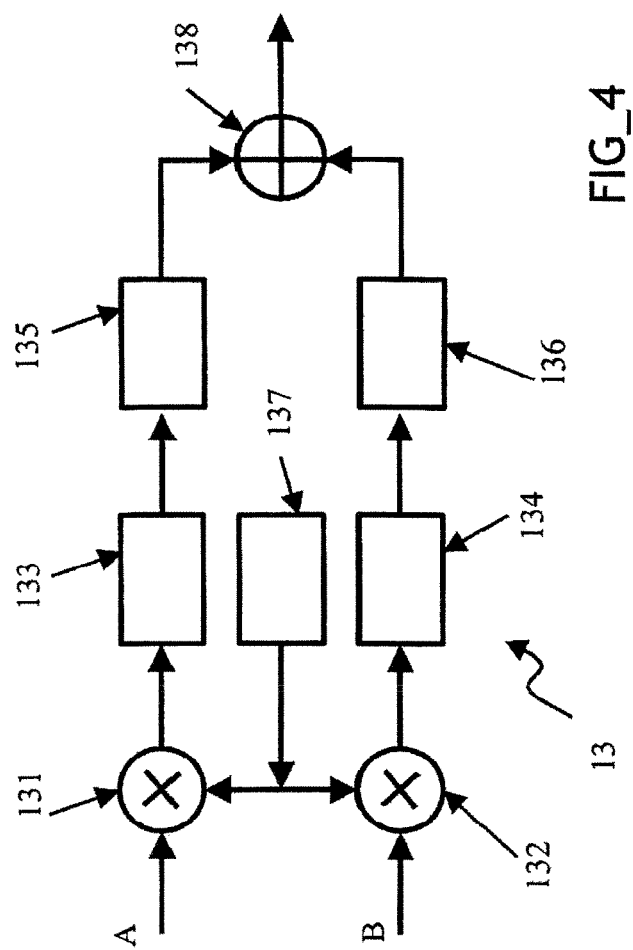
FIG_4

METHOD FOR REDUCING INTERFERENCE IN A RADIO NETWORK EQUIPMENT AND EQUIPMENT PERFORMING THE METHOD

This application is based on and claims the benefit of European Patent Application No. 08300192.5 filed Apr. 24, 2008, which is incorporated by reference herein in its entirety.

The present invention relates to wireless transmission. In particular the invention relates to reducing interference. More particularly, the invention relates to front-to-back interference in point-to-point wireless transmission systems with antenna arrangement having low angular discrimination.

BACKGROUND OF THE INVENTION

As it is well known, wireless communication usually requires a transmitter equipment and a receiver equipment. The transmitter and the receiver equipment typically use antennas. In practice, it may occur that the transmitter antenna and the receiver antenna are installed very close to each other. In many occasions, both the transmitter antenna and the receiver antenna are installed on the same site, for example on the same tower or building.

Also in many occasions it may occur that the signal transmitted from the transmitter equipment is at the same frequency as that of the signal received by the receiver equipment, i.e. they use the same frequency channel. This may occur, for example, when different values of frequencies are not available due to the fact that radio resources are limited. The use of the same frequency channels may give rise to the so called front-to-back interference. This problem is particularly more likely to arise when the angular discrimination between the transmitter antenna and the receiver antenna in the same location is relatively low, for example less than 90°. Therefore, it may be desirable to avoid such relatively low angular discriminations. However, the setting of the angular discrimination between the transmitter antenna and the receiver antenna is in many occasions conditioned by factors which in practice would not allow for a free choice of a desirable value, for example factors such as the physical location of the sites which communicate with each other or even the availability of space on the tower on which the two antennas are to be installed or the particular geographical conditions where the paths are arranged. One example of such situation is schematically shown in FIG. 1, wherein sites A, B and C are adapted to communicate with each other for example using point-to-point communication. In this example, site A is assumed to have a transmitting antenna which is pointed towards the remote receiving site C. Furthermore, site A is assumed to have a receiving antenna which is pointed towards a remote transmitting site B.

As shown, site A transmits a signal to site C using transmission frequency CHx and receives a signal from site B using the same transmission frequency CHx. The location of the respective receiving and transmitting remote sites C and B conditions the angular discrimination, α in this case, between the transmitting and receiving antennas of the site A and as the same frequency is used in transmission and reception at site A, this site is likely to experience front-to-back interference (assuming that the angle α is relatively low as discussed above).

SUMMARY OF THE INVENTION

The invention proposes the use of a Cross-Polar Interference Canceller (XPIC) comprised in a receiver equipment which may be subject to interference, in order to reduce the iso-frequency (co-channel) interference likely to be generated by the transmitted signal transmitted from a neighboring antenna with not enough angular discrimination so as to avoid interference. Cross-polarization interference cancellers (XPIC) are known devices which are commonly used in order to reduce mutual interference of two signals travelling over the same carrier frequency, but on opposite polarisation to negligible levels.

The XPIC is capable of providing what is known as an improvement factor sufficient to increase the carrier-to-interference ratio at a level where the effect of cochannel interference is substantially eliminated or at least reduced to a negligible level such that degradation in the performance of the system is substantially absent.

Cross-Polarization Isolation (XPI) as defined for two radio waves transmitted with the same power and orthogonal polarizations, is the ratio at the reception point of the power level of a first radio wave received with respect to the second radio wave received, in the expected polarization of the first wave. The system operating at the same frequency channel on orthogonal polarisation in the same route (co-channel system) can transmit double capacity signal rather than that of the interleaved use.

The improvement factor (XPIF) of the XPIC is the Cross-Polarization Isolation (XPI) difference between a performance with XPIC and a performance without XPIC at specified carrier-to-interference ratio C/I and BER conditions. The carrier-to-interference ratio (C/I, also known as CIR), is known in the art to represent a ratio between the average power of a modulated carrier and the average power of a co-channel interference as received by the same receiver.

Accordingly there is provided a method for reducing interference between at least two adjacent antennas comprising the steps of:
  transmitting a first signal from a transmitter equipment
  receiving a second signal by a receiver equipment
  inputting the first and the second signal into a cross-polar interference canceller, included in the receiver equipment
  calculating a respective power and/or a respective BER of the first and the second signals
  selecting between the first signal and the second signal the signal that has its respective power greater than the respective power of the other signal, or the one that has its respective BER lower than the respective BER of the other signal; or
  selecting between the first signal and the second signal the signal that has its respective power greater than the respective power of the other signal and has its respective BER lower than the respective BER of the other signal.

According to one embodiment, the first signal and the second signal have respective frequencies being substantially close to each other in value.

According to another, the first and the second signal have the same frequency.

Furthermore, there is provided a receiver equipment adapted for receiving a receive signal from a first antenna and a cross-polar interference signal from a second antenna adjacent to the first antenna, wherein the receiver equipment comprises a cross-polar interference canceller adapted for receiving the receive signal and the cross-polar interference signal, the receiver equipment having
  means for calculating a respective power and/or a respective BER of the receive signal and the cross-polar interference signal means for selecting between the receive signal and the cross-polar interference based on said calculated values of respective power, or respective BER individually or in combination.

According to one embodiment, the cross-polar interference canceller comprises a at least two branches, each of the at least two branches comprising a mixer and a fractionally spaced equalizer and further comprising a clock unit for providing clock signal to each of the at least two branches and a combiner for combining respective outputs of the fractionally spaced equalizers of the at least two branches.

There is further provided a computer program product for the implementation of the steps of the method of the invention, when this program is run on a computer, an ASIC, an FPGA or a microprocessor.

Furthermore, there is provided a computer readable storage means having a message therein, such computer readable storage means containing program code means corresponding to a program for the implementation of the steps of the method of the invention, when this program is run on a computer, an ASIC, an FPGA or a microprocessor.

BRIEF DESCRIPTION OF THE DRAWINGS

FIG. 1, already described, schematically represents an exemplary communication scenario with receiving and transmitting sites.

FIG. 2 is a schematic representation of an arrangement including a receiver equipment and a transmitter equipment wherein the front-to-back interference may be reduced.

FIG. 3 is an exemplary plot graph of an antenna radiation pattern

FIG. 4 is a schematic representation of elements of a Cross-Polar Interference Canceller.

DESCRIPTION OF PREFERRED EMBODIMENT

The invention proposes the use of an XPIC device in a receiver equipment in order to reduce the interference level of the co-channel signal coming from the adjacent antenna, as already discussed above. In a nodal configuration, where the frequency allocation is a scarce resource, a front-to-back interference could be produced by a transmitter equipment over a signal at the same frequency received at a receiver equipment.

FIG. 2 schematically shows an exemplary arrangement including a receiver equipment 1 and a transmitter equipment 2. It is assumed that the receiver equipment 1 receives signals in a first direction d1 and the transmitter equipment 2 transmits signals in a second direction d2, where d1 and d2 are at an angle $\alpha$ with respect to each other. This angle $\alpha$ represents the angular discrimination between the receiver equipment 1 and the transmitter equipment 2. It is further assumed that angle $\alpha$ has a value less than 90°.

Therefore, if the frequency of the signal received by the receiver equipment 1 is the same, or substantially close, to the frequency of the signal transmitted by the transmitter equipment 2, then front-to-back interference occurs in the receiver equipment 1 caused by the effect of the signal transmitted by transmitter equipment 2 on the receiver equipment 1.

The receiver equipment 1 typically comprises a receiver unit 11 and a demodulator 12.

The received radio frequency (RF) signal is filtered and then amplified in the receiver unit 11 with a very low noise amplifier. The signal is subsequently down-converted to the desired intermediate frequency (IF) and is then amplified. The microwave power required for the conversion is supplied by a local oscillator. The signal is then bandlimited in an IF filter, amplified to a constant level in the main IF amplifier and fed to the demodulator 12. The IF signal is baseband converted by means of two mixers that are controlled by a carrier recovery circuit. The transmitter equipment 2 typically comprises a transmitter unit 21 and a modulator 22.

In a typical implementation, two IF in-quadrature carriers are modulated by two filtered signals by means of two balanced mixers. Then, modulated carriers are summed in order to generate a multi-level QAM modulated signal. The IF signal coming from the modulator is fed to an IF amplifier. The amplifier chain, recovers the cable loss, in order to have a constant level at the input of the IF amplifier. The signal from the IF amplifier is fed to an up-converter. Next the IF signal is up-converted to RF frequencies. The output signal of the up-converter is fed to an RF power amplifier with a defined output power.

According to the invention, the receiver equipment 1 further comprises a Cross-Polar Interference Canceller (XPIC) 13. As shown in FIG. 2, the XPIC 13 is connected to the demodulator 12 of the receiver equipment 1 and also to the modulator 22 of the transmitter equipment 2.

The modulator 22 inputs a signal into the XPIC containing an Intermediate Frequency (IF) contribution of the signal which is to be transmitted from transmitter equipment 2. This IF contribution conveys information in order to allow the XPIC to distinguish the undesired component, namely to distinguish the component of the received signal related to the interference by the transmitter equipment, from the useful (desired) signal, and cancel the undesired component. The cancelling operation of the XPIC will be described further below in relation to FIG. 4.

In order to obtain corresponding values for attenuation as a function of angular discrimination, use is made of an antenna radiation pattern, an example of which is shown in the plotted graph of FIG. 3. It is to be noted that antenna radiation patterns are typically provided by the manufacturers. In FIG. 3, attenuation is shown in the ordinate in dB and angular discrimination is shown in the abscissa in degrees (it is to be noted that a part of this axis, from 0 to 15° is shown in "expanded scale" as compared to the rest of the values higher than 15°

It is assumed that:
PTx is the power of the transmitted signal [in dBm]
PRx is the power of the received signal [in dBm]
C/I is the carrier to interference ratio
XPIF is the improvement factor of the XPIC [in dB]
$\alpha$ is the angular discrimination between the two antennas
Att is the attenuation [in dB] of the peak signal as a function of angle $\alpha$ obtained from the antenna radiation pattern (FIG. 3).

In case, the XPIC 13 is not used, the limit value of the attenuation in order to guarantee a performance of the equipment without any (or negligible) degradation is derived from the following equation:

$$\text{Att}(1) = 0.5 \times [\text{PRx} - \text{C/I} - \text{PTx}] \qquad \text{Eq. 1}$$

However when the XPIC is used, the value of attenuation is derived from the following equation:

$$\text{Att}(2) = 0.5 \times [\text{PRx} - \text{C/I} - \text{PTx} + \text{XPIF}] \qquad \text{Eq. 2}$$

It is readily observed that equation 2 provides a better (lower) attenuation value due to the improvement factor provided by the XPIC. The better (lower) value of attenuation allows for lower angular discrimination values. This is shown in the numerical example below.

Assuming that:

PRx=−60 dBm [this being a typical value]

PTx=+30 dBm [this being a typical value]

C/I=30 dB [this being a typical value for a system transmitting an STM-1 carrier using a modulation scheme of 128-states], XPIF=30 dB From the previous equations 1 and 2, and according to the antenna radiation pattern of FIG. 3, we obtain:

Att(1)=0.5×[−60−30−30]=−60 dB

Referring now to FIG. 3, an angle of discrimination corresponding to an attenuation of −60 dB is in the range of about 90°. This is shown by means of dotted lines L11 and L12.

Att(2)=0.5×[−60−30−30+30]=−45 dB

Referring again to FIG. 3, an angle of discrimination corresponding to an attenuation of −45 dB is in the range of about 40°. This is shown by means of dotted lines L21 and L22.

The difference in attenuation as shown in the example above make it possible to achieve a reduction in the acceptable (operational) value of the angular discrimination from 90° up to 40°, as can be appreciated from the difference in values of Att(1) and Att(2) in conjunction with the antenna radiation pattern of FIG. 3. Using this solution therefore, provides the possibility of achieving an improvement factor (XPIF) of about 30 dB provided by the XPIC while at the same time any effect due to the front-to-back interference is avoided or substantially reduced.

FIG. 4 is a schematic representation of a cross-polar interference canceller (XPIC) 13 showing only certain elements thereof for the purpose of better understanding this description. The XPIC has two branches A and B. In branch A there is shown a mixer 131, a low-pass filter 133 and a fractionally spaced equalizer (FSE) 135. Likewise, in branch B there is shown a mixer 132, a low-pass filter 134 and a fractionally spaced equalizer (FSE) 136. A voltage controlled oscillator (VCO) 130 is used as a clock which is common to both branches. The two branches are then fed into a combiner 139. The corresponding elements of the branches are preferably identical in type and functionality.

A signal is input in branch A and another signal is input in branch B. It is assumed that from these two signals one is the desired signal (the signal to be recovered) and the other is the cross-polar interference (thus undesired) signal.

As a practical example of implementation, four dimensional 19 taps FSEs may be used, with a modified Uyematsu-Sakaniwa algorithm. FSEs are insensitive to a quadrature error on the receive side and so there is no need for a circuit for quadrature control. Carrier synchronisation is based on synchronous down conversion and coherent demodulation of the two signals. A clock signal 130 is fed into both mixers 131 and 132. It is assumed that the mixer 131 receives at its input in branch A the desired wave (namely the signal received the direction d1 as shown in FIG. 2) and the mixer 132 receives at its input the undesired signal (namely the signal received in the direction d2 as shown in FIG. 2). The input signals are clocked in the respective mixers 131 and 132, shaped in the respective low-pass filters 133 and 134 and fed into the respective FSEs 135 and 136. The outputs of the FSEs 135 and 136 are input into a combiner which is used in order to decide which of the two waves is to be selected.

At this stage, estimated values of the power and the Minimum Mean Square Error (MMSE) of the signals at the respective output of each FSE 135 and 136 are calculated. The MMSE information provides the necessary parameters in order to elaborate the respective Bit Error Rate (BER) of the signals.

Then according to one option, the signal that has a respective power value greater than the respective power value of the other signal is selected.

According to another option, the signal that has a respective BER value lower than the respective BER value of the other signal is selected According to a further option, the signal that has a respective power value greater than the respective power value of the other signal and a respective BER value lower than the respective BER value of the other signal is selected.

In this manner the desired signal, which is the signal received in the direction d1 is recovered and thus front-to-back interference caused by the signal in the direction d2 and generated by the transmitter located nearby is cancelled.

It is noted that the performance of the fractionally spaced equaliser is insensitive to the timing instant, thus only the synchronization of the clock frequency is required and the cross-polar wave (in this example, the wave input in the FSE 136 of branch B) requires only coarse adjustment of the differential delay between the two paths.

The use of the XPIC improves significantly the level of attenuation caused by front-to-back interference. In the following, the improvement in performance achieved by using an XPIC is shown analytically and also by means of a numerical example.

One advantage of the proposed solution is that it may help overcome at least some problems caused by network congestion and may help to improve system performance, because it allows a reduction of the angular discrimination of the antennas where the topology of the network requires to install antennas on the same tower and the limited number of available frequencies requires the re-use of the same frequency in a particular nodal arrangement.

The proposed solution can also be applied to a multi-channel arrangement configuration, where N receivers are interfered by N transmitter operating at the same corresponding frequencies.

The receiver equipment and/or the transmitter equipment may include blocks which can be hardware devices, software modules or combination of hardware devices and software modules.

This method can be advantageously implemented on equipment including means such as an Application Specific Integrated Circuit (ASIC), a Field Programmable Gate Array (FPGA) and/or a microprocessor, and in a preferred embodiment through or together with a software program like Very high speed integrated circuit Hardware Description Language (VHDL) or C programming language.

Therefore, it is understood that the scope of the protection is extended to such a program product and in addition to a computer readable storage means having a message therein, such computer readable storage means contain program code means for the implementation of one or more steps of the method, when this program is run on a computer, an ASIC, an FPGA or a microprocessor.

It is to be noted that the receiver equipment of the invention can be used to practice another and materially different method and is not be construed to be limited to practicing only the method as claimed in the present invention.

Likewise, the method of the invention can be practiced by another materially different system, device, apparatus or equipment than the one(s) claimed in the present invention.

Further it is to be noted that the list of structures corresponding to the claimed means is not exhaustive and that one skilled in the art understands that equivalent structures can be substituted for the recited structure without departing from the scope of the invention.

It is also to be noted that the order of the steps of the method of the invention as described and recited in the corresponding claims is not limited to the order as presented and described and may vary without departing from the scope of the invention.

The invention claimed is:

1. A method for reducing interference between at least two adjacent antennas comprising a receiver equipment antenna and a transmitter equipment antenna, comprising:
   transmitting a first signal from the transmitter equipment antenna;
   receiving the first signal at the receiver equipment antenna;
   receiving a second signal at the receiver equipment antenna;
   inputting the received first and second signals into a cross-polar interference canceller, included in the receiver equipment, for processing;
   calculating at least one of a respective power and a respective BER of the processed first and the second signals;
   selecting, between the processed first signal and the processed second signal, the signal that has its respective power greater than the respective power of the other signal, or the one that has its respective BER lower than the respective BER of the other signal; or
   selecting between the processed first signal and the processed second signal the signal that has its respective power greater than the respective power of the other signal and has its respective BER lower than the respective BER of the other signal;
   wherein the transmitter equipment antenna and receiver equipment antenna are installed adjacent to each other on a common tower.

2. The method of claim 1, wherein the first signal and the second signal have respective frequencies being substantially close to each other in value.

3. The method of claim 2, wherein the first and the second signal have the same frequency.

4. The method of claim 1 implemented in a computer program product that is stored on a non-transitory computer-readable medium, wherein the program is run on at least one of a computer, an ASIC, an FPGA, and a microprocessor.

5. The method of claim 1 implemented in a program that is stored on a non-transitory computer-readable medium, wherein the computer program comprises program code corresponding to the program, and wherein the program is run on at least one of a computer, an ASIC, an FPGA, and a microprocessor.

6. A receiver equipment adapted for receiving a receive signal from a receive antenna and a cross-polar interference signal from a transmit antenna adjacent to the receive antenna, wherein the receiver equipment comprises:
   a cross-polar interference canceller adapted for receiving and processing the receive signal and the cross-polar interference signal; and
   a microprocessor configured to:
   calculate at least one of a respective power and a respective BER of the processed receive signal and the processed cross-polar interference signal; and
   select between the processed receive signal and the processed cross-polar interference based on said calculated at least one of respective power and respective BER;
   wherein the receive antenna and the transmit antenna are installed adjacent to each other on a single tower.

7. The receiver equipment of claim 6 wherein the receive signal and the cross-polar interference signal have respective frequencies being substantially close to each other in value.

8. The receiver equipment of claim 7 wherein the receive signal and the cross-polar interference signal have the same frequency.

9. A receiver equipment adapted for receiving a receive signal from a receive antenna and a cross-polar interference signal from a second transmit antenna installed adjacent to the receive antenna on a single tower, wherein the receiver equipment comprises:
   a cross-polar interference canceller adapted for receiving and processing the receive signal and the cross-polar interference signal; and
   a microprocessor configured to:
   calculate at least one of a respective power and a respective BER of the processed receive signal and the processed cross-polar interference signal; and
   select between the processed receive signal and the processed cross-polar interference based on said calculated values of at least one of respective power and respective BER;
   wherein the cross-polar interference canceller comprises at least two branches, each of the at least two branches comprising a mixer and a fractionally spaced equalizer and further comprising a clock unit for providing clock signal to each of the at least two branches and a combiner for combining respective outputs of the fractionally spaced equalizers of the at least two branches.

* * * * *